(No Model.)

T. F. HANDLY.
AUTOMATIC GRAVITY FIRE EXTINGUISHER.

No. 483,491. Patented Sept. 27, 1892.

Witnesses:

Inventor:
Thomas F. Handly
Per O. D. Lewis
Att'y.

UNITED STATES PATENT OFFICE.

THOMAS F. HANDLY, OF ALLEGHENY, PENNSYLVANIA.

AUTOMATIC GRAVITY FIRE-EXTINGUISHER.

SPECIFICATION forming part of Letters Patent No. 483,491, dated September 27, 1892.

Application filed January 11, 1892. Serial No. 417,773. (No model.)

*To all whom it may concern:*

Be it known that I, THOMAS F. HANDLY, a citizen of the United States, residing at Allegheny, in the county of Allegheny and State of Pennsylvania, have invented certain new and useful Improvements in Automatic Gravity Fire-Extinguishers; and I do hereby declare the following to be a full, clear, and exact description of the invention, such as will enable others skilled in the art to which it pertains to make and use the same, reference being had to the accompanying drawings, which form a part of this specification.

My invention relates to an improved automatic-operating fire-extinguisher; and it consists in certain details of construction and combinations of parts, as will be fully described hereinafter.

Figure 1:
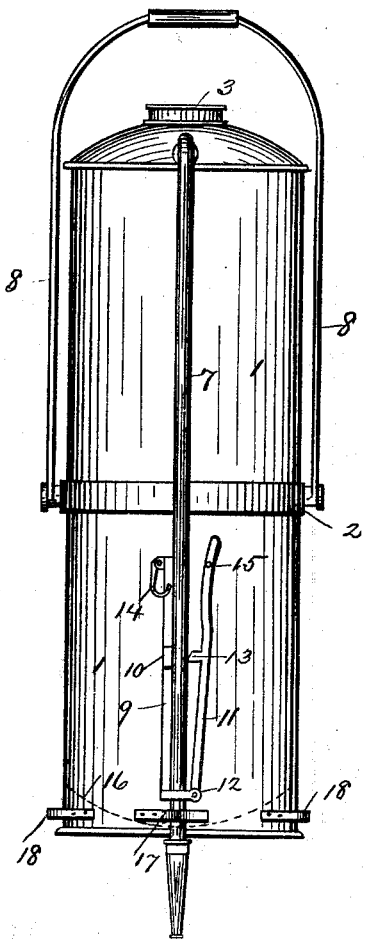
Figure 3:
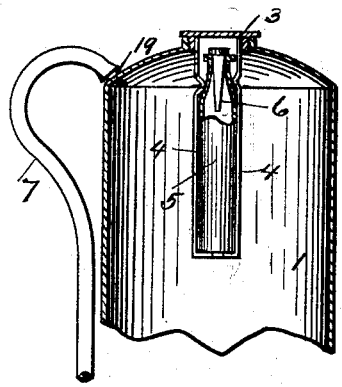
Figure 2:
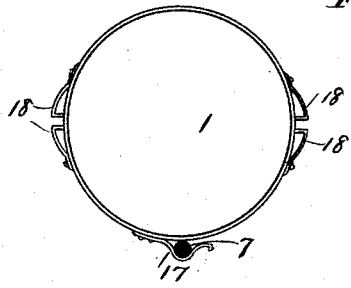

In the accompanying drawings, Figure 1 is a side elevation of my improved automatic fire-extinguisher, which is constructed in accordance with my invention. Fig. 2 is a sectional plan view of the same. Fig. 3 is a vertical sectional view of the upper portion of my improved fire-extinguisher, showing the bottle or means for introducing the chemicals into the water.

To construct a fire-extinguisher in accordance with my invention, I provide a cylindrical-shaped vessel 1, of a suitable size and form of construction, having a rounded interior base 16 and a rounded top fitted with a cap 3. Attached to this vessel 1 below the center is a band 2 for the purpose of connecting thereto the bail or handle 8 in such a manner that when the apparatus is lifted by the said handle 8 the same will reverse or turn bottom upward, as the center of gravity is above the band 2. Attached at suitable points near the base of the apparatus are spring-clips 18, which when the extinguisher reverses itself grips the bail 8 and confines the same therein until released by pressing the springs inward. Attached to the cap 3 and projecting downwardly is a wire cage 4, capable of containing a bottle 5, in which is placed sulphuric acid. This bottle 5 is provided with a loose stopper 6, formed of a heavy metal and having an elongated tapering portion projecting into the mouth of the bottle, so that when the apparatus is reversed the contents of the bottle will have free passage from the same and the stopper 6 will still remain inserted in the mouth of the bottle. Connected to the top of the extinguisher is a short rubber hose 7, provided with a nozzle. This hose when not in use is held to the side of the apparatus by means of a spring-clip 17, secured near the base of the same. Attached to this hose is a plate 9, to which is pivoted a lever 11, having an inwardly-projecting portion 13, which when pressed against the hose closes the same against a widened portion of the plate 9 and prevents the escape of the liquid from the interior of the apparatus, and thereby acts as a shut-off or valve. This lever 11 may be held in close contact with the hose 7 by engaging a hook 14 with a small projecting pin 15, formed on the said lever.

In operation water mixed with bicarbonate of soda is introduced into the apparatus through the opening at the top by removing the cap 3 and the acid-bottle and said cap 3 replaced in position, which render the extinguisher ready for use. Should a fire occur, the extinguisher is lifted from its stand by the bail 8, and as the center of gravity is above its connection with the body of the apparatus the same reverses itself, which will cause the stopper 6 to move partly out of the mouth of the bottle 5 until stopped by contact with the interior of the cap 3, thereby permitting the acid in the said bottle to mingle with the water and bicarbonate of soda, which generates a gas and pressure within the apparatus for a purpose well known in the art. When the apparatus has been thus reversed, the bail 8 engages with the spring-clip 18 and makes the same rigid with the body of the apparatus and renders the same easy to handle. To shut off the flow from the hose, it is only necessary to press the lever 13 toward the plate 9 and, if desired, engage the hook 14 with the pin 15.

In my device there are no valves, cocks, or other moving parts to become corroded by the non-use of the extinguisher, and the apparatus is entirely automatic in its operation and gives notice of successful working the moment the same is reversed by lifting the extinguisher by the bail or handle. This advantage of the immediate operation without manipulation of valves or cocks is of vast importance when the apparatus is to be handled by inexperienced or ignorant workmen about public works or buildings.

Having thus described my invention, what I claim, and desire to secure by Letters Patent, is—

1. In a fire-extinguisher, the combination, with the receptacle 1, designed to be inverted for use, and a hose connected with said receptacle, of an acid-receptacle supported within said receptacle 1 near the top thereof and a loose stopper for said acid-receptacle, said stopper having a projection extending within said acid-receptacle and of greater length than the distance between the top of said acid-receptacle and the adjacent wall of the receptacle 1, as and for the purposes specified.

2. In an apparatus for the purpose described, the combination consisting of the receptacle 1, having a bail pivoted below the center of gravity of the same, an acid-bottle attached in the interior of the apparatus, having a heavy elongated stopper capable of being removed partly from the mouth of the bottle by gravity, a means for making the bail rigid with the body of the apparatus when the same has been reversed, a hose connected with the extinguisher, and a means for closing the same by compression, substantially as and for the purpose described.

In testimony that I claim the foregoing I hereunto affix my signature this 28th day of December, A. D. 1891.

THOMAS F. HANDLY. [L. S.]

In presence of—
CHARLES LARGE,
M. E. HARRISON.